United States Patent
Drack et al.

(10) Patent No.: US 9,658,124 B2
(45) Date of Patent: May 23, 2017

(54) SYSTEM AND METHOD FOR WIND TURBINE OPERATION

(71) Applicant: General Electric Company, Schenectady, NY (US)

(72) Inventors: Lorenz Edwin Drack, Munich (DE); Benoit Philippe Petitjean, Munich (DE); Pratish Patil, Bangalore (IN)

(73) Assignee: General Electric Company, Niskayuna, NY (US)

( * ) Notice: Subject to any disclaimer, the term of this patent is extended or adjusted under 35 U.S.C. 154(b) by 265 days.

(21) Appl. No.: 14/533,566

(22) Filed: Nov. 5, 2014

(65) Prior Publication Data

US 2016/0123307 A1     May 5, 2016

(51) Int. Cl.
| | | |
|---|---|---|
| *G01L 11/00* | (2006.01) | |
| *G01P 3/80* | (2006.01) | |
| *G01P 5/14* | (2006.01) | |
| *G01P 13/02* | (2006.01) | |
| *G01F 1/00* | (2006.01) | |
| *F03D 11/00* | (2006.01) | |

(52) U.S. Cl.
CPC .......... *G01L 11/00* (2013.01); *F03D 11/0091* (2013.01); *G01F 1/00* (2013.01); *G01P 3/80* (2013.01); *G01P 5/14* (2013.01); *G01P 13/025* (2013.01)

(58) Field of Classification Search
CPC ............. F03D 11/00; F03D 7/04; F03D 13/30
USPC ....... 73/112.01, 118.03, 116.03, 147, 170.02
See application file for complete search history.

(56) References Cited

U.S. PATENT DOCUMENTS

| | | |
|---|---|---|
| 5,341,677 A | 8/1994 | Maris |
| 6,065,334 A | 5/2000 | Corten |
| 6,474,935 B1 | 11/2002 | Crotty et al. |

(Continued)

FOREIGN PATENT DOCUMENTS

| | | |
|---|---|---|
| EP | 1908927 A1 | 4/2008 |
| EP | 2180183 A1 | 4/2010 |

(Continued)

OTHER PUBLICATIONS

Maldonado et al., "Active control of flow separation and structural vibrations of wind turbine blades", Wind Energy, vol. 13, Issue 2-3, 2010, pp. 221-237.

(Continued)

*Primary Examiner* — Daniel S Larkin
*Assistant Examiner* — Anthony W Megna Fuentes
(74) *Attorney, Agent, or Firm* — Nitin N. Joshi

(57) ABSTRACT

A method for determining a flow condition includes disposing a plurality of sensors on a surface and receiving a first sensor signal and a second sensor signal from the plurality of sensors. The method further includes determining at least one correlation parameter based on the first sensor signal and the second sensor signal. The method also includes receiving a plurality of stored parameters from a database, wherein each of the plurality of stored parameters is representative of a corresponding flow condition. The method also includes comparing the at least one correlation parameter with the plurality of stored parameters and selecting at least one matching stored parameter and determining a matching flow condition based on the at least one matching stored parameter.

20 Claims, 5 Drawing Sheets

(56) References Cited

U.S. PATENT DOCUMENTS

| | | | |
|---|---|---|---|
| 7,261,002 B1* | 8/2007 | Gysling | G01F 1/708 |
| | | | 73/861.42 |
| 8,057,175 B2 | 11/2011 | Vadari et al. | |
| 8,185,291 B2 | 5/2012 | Nakakita et al. | |
| 8,712,703 B2 | 4/2014 | Olesen | |
| 2010/0284785 A1 | 11/2010 | Wadia et al. | |
| 2013/0080081 A1* | 3/2013 | Dugger | G01F 1/667 |
| | | | 702/48 |
| 2013/0156593 A1 | 6/2013 | Gupta et al. | |
| 2013/0259702 A1 | 10/2013 | Eisenberg et al. | |
| 2014/0010654 A1 | 1/2014 | Fajardo et al. | |

FOREIGN PATENT DOCUMENTS

| | | |
|---|---|---|
| EP | 2202408 A2 | 6/2010 |
| EP | 2246559 A3 | 5/2014 |

OTHER PUBLICATIONS

Pusha et al., "Efficiency Analysis of Hydraulic Wind Power Transfer System", Electro/Information Technology (EIT), 2013 IEEE International Conference on, May 2013, 7 Pages.

* cited by examiner

SYSTEM AND METHOD FOR WIND TURBINE OPERATION

BACKGROUND

Embodiments of the present technique relate to a system and method for determining a flow condition and more particularly to determination and correction of the flow condition in wind turbines.

Wind turbines are increasingly being deployed as a renewable source of energy. One of the important aspects of wind turbine operation is to optimize wind turbine performance. Wind turbine optimization may be characterized by parameters such as aerodynamic efficiency, energy output, and noise, for example. Optimized operation of the wind turbine would lead to a reduced cost of energy and other benefits.

Modern wind turbines include very long blades experiencing large wind variations. Wind turbine blades designed for constant tip speeds, experience varying flow conditions due to varying wind dynamics and the presence of the earth's boundary layer. Impact of the wind variation across the blade may be reduced by employing local actuators that can vary the blade aerodynamics via flow control, blade pitch changes or changes to other operating parameters. This approach also reduces the wind induced loading on the rotor.

It is advantageous to detect local instantaneous blade flow state that can be used to provide information about effective inflow angle of attack which may further be used to apply local actuation to alter the aerodynamics of the blades and to improve the flow state. Flow separation of the boundary layer of the blade may generate stall. When stall occurs, lift generated by the blade reduces and also the torque imparted by the wind to the wind turbine is lost. Diminishing or delaying the flow separation maximizes lift and minimize drag.

An automated control system for controlling the flow condition is required for optimized operation of the wind turbine. Such a control system requires measurement of flow conditions on a continuous basis, particularly in severe or turbulent operating environments.

BRIEF DESCRIPTION

In accordance with one aspect of the invention, a method is disclosed. The method includes disposing a plurality of sensors on a surface and receiving a first sensor signal and a second sensor signal from the plurality of sensors. The method further includes determining at least one correlation parameter based on the first sensor signal and the second sensor signal. The method also includes receiving a plurality of stored parameters from a database, wherein each of the plurality of stored parameters is representative of a corresponding flow condition. The method also includes comparing the at least one correlation parameter with the plurality of stored parameters and selecting at least one matching stored parameter and determining a matching flow condition based on the at least one matching stored parameter.

In accordance with another aspect of the invention, a system is disclosed. The system includes at least one processor module and a memory module communicatively coupled to a communications bus. The system also includes a database module storing a plurality of stored parameters. Each of the plurality of stored parameters is representative of a corresponding flow condition. The system includes a data acquisition module configured to receive a first sensor signal and a second sensor signal from a plurality of sensors disposed on a surface. The system further includes a correlation generation module communicatively coupled to the data acquisition module and configured to determine at least one correlation parameter based on the first sensor signal and the second sensor signal. The system also includes a flow condition generator communicatively coupled to the database module and the correlation generator module and configured to compare the at least one correlation parameter with the plurality of stored parameters and selecting at least one matching stored parameter. The flow condition generation module is further configured to determine a matching flow condition based on the at least one matching stored parameter. At least one of the database module, the data acquisition module, the correlation generation module, and the flow condition generation module of the system is stored in the memory and executable by the processor.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

The embodiment of a method and system for the determination of flow condition or effective inflow angle of attack in wind turbines includes receiving a plurality of sensor signals from a plurality of sensors and determining at least one correlation parameter based on the plurality of sensor signals. The at least one correlation parameter is compared with a plurality of stored parameters stored in a database. The plurality of stored parameters are representative of a corresponding flow condition. At least one matching stored parameter is determined based on the comparison of the at least one correlation parameter with the plurality of stored parameters. A matching flow condition is determined based on the at least one matching stored parameter.

As used herein, the term 'surface' refers to a solid object travelling through a fluid or to a stationary object disposed in a moving fluid. The surface may refer to a wind turbine blade, an aircraft wing, a glider, or spherical objects such as a tennis ball or a golf ball. The term 'flow' refers to the relative motion of particles of the fluid with reference to the surface. The term 'flow condition' refers to a type of flow characterized by relative importance of viscous forces in the boundary layer and inertial force associated with the fluid. The term 'sensor signal' is a plurality of measurements acquired from a sensor such as a velocity sensor or a pressure sensor. The term 'correlation parameter' refers to a measure of similarity between a pair of plurality of measurements acquired from a pair of sensors respectively. The term 'stored parameter' refers to a measure of similarity between a pair of sensor signals corresponding to a known flow condition and stored in the database for reference and diagnostic purposes. The terms 'flow of attack' and 'effective inflow angle of attack' refer to an angle between the axis of the surface and a direction of the flow experienced by the surface.

Figure 1:
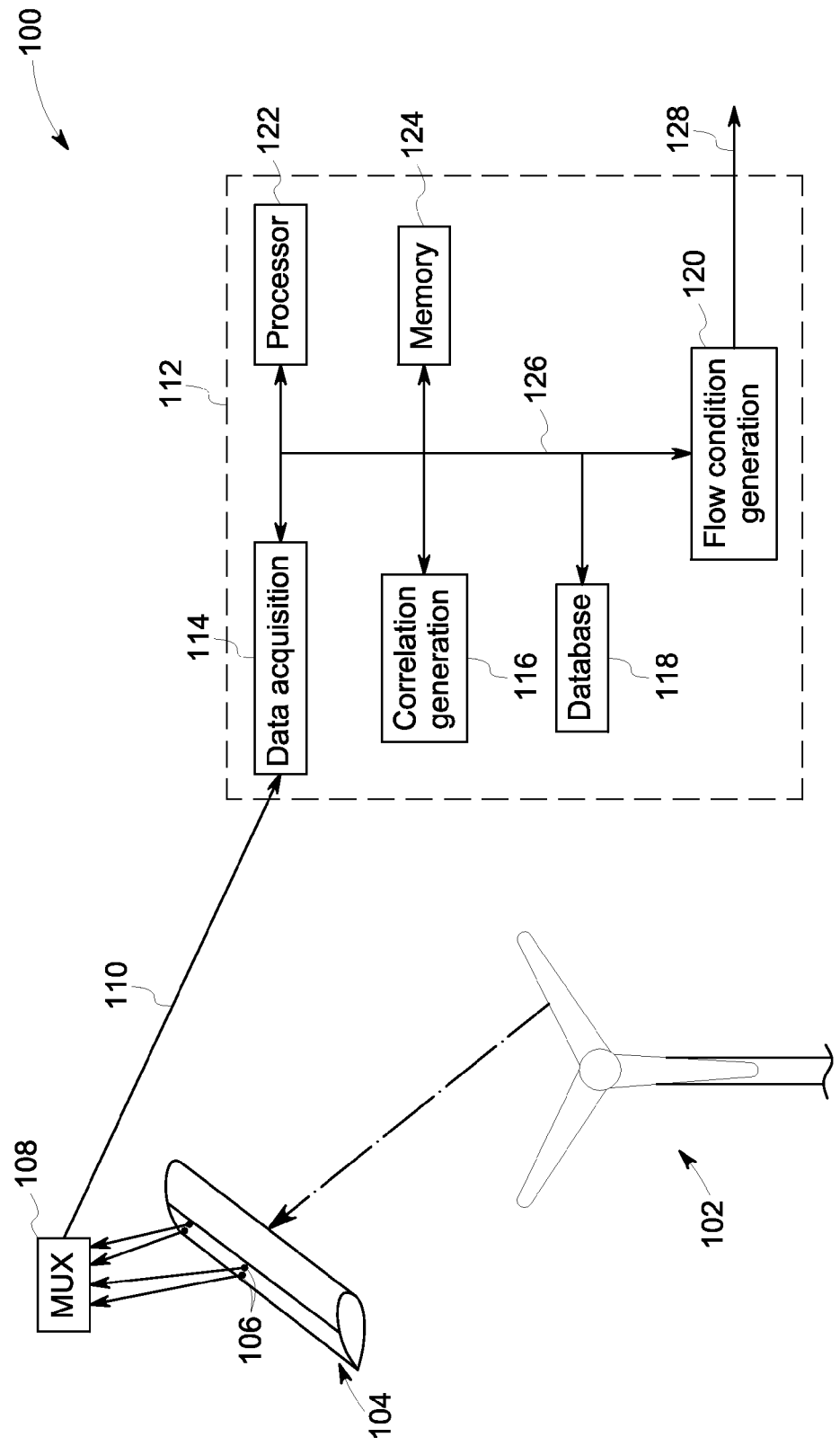
FIG. 1 is a diagrammatic illustration of a system for determining flow condition in accordance with an exemplary embodiment.

FIG. 1 is a diagrammatic illustration 100 of a system 112 for determining a flow condition 128 in accordance with an exemplary embodiment. In embodiments represented by the illustration 100, the system 112 is communicatively coupled to a plurality of sensors 106 disposed on a surface 104 of an aerodynamic system such as a wind turbine 102. The communication between the system 112 and the plurality of sensors may be facilitated by a hardware component such as a multiplexer 108. The system 112 includes a data acquisition module 114, a correlation generation module 116, a database module 118, a flow condition generation module 120, a processor 122, and a memory 124. The plurality of system modules 114, 116, 118, 120, 122, and 124 are communicatively coupled to each other through a communications bus 126. The system 112 receives a plurality of sensor signals 110 and determines the flow condition 128.

In the illustrated embodiment, the surface 104 is a blade surface of the wind turbine 102. In alternative embodiments, the surface may be a wing surface of an aircraft or a glider surface. In one embodiment, the plurality of sensors 106 disposed on the surface 104 may be a plurality of velocity sensors sensing a velocity of the fluid relative to the surface 104. In an alternate embodiment, the plurality of sensors 106 may be a plurality of pressure sensors sensing pressure variations of the fluid on the surface 104. In the embodiment where pressure sensors are used, the plurality of sensor signals 110 would be a plurality of pressure signals, whereas in the embodiment where velocity sensors are used, the plurality of sensor signals 110 would be a plurality of velocity signals. The configuration of the plurality of sensors 106 disposed on the surface 104 is explained in detail in a subsequent paragraph with reference to a subsequent figure.

The data acquisition module 114 is communicatively coupled to the plurality of sensors 106 to receive the plurality of sensor signals 110. The plurality of sensor signals 110 includes at least one first sensor signal and at least one second sensor signal. The data acquisition module 114 may receive the plurality of sensor signals 110 in a multiplexed form generated by multiplexing the signals in the plurality of signals. In one embodiment, the data acquisition module performs demultiplexing operation on the received signal 110 and extracts the first sensor signal and the second sensor signals corresponding to a first sensor and a second sensor among the plurality of sensors. It should be noted herein that, the data acquisition module in general may extract multiple pairs of sensor signals from the plurality of sensors 106. In each pair of sensor signal, one signal is referred herein as the first sensor signal and another signal is referred herein as the second sensor signal. The plurality of sensor signals 110 having the first sensor signal and the second sensor signal are provided to the correlation generation module 116.

The correlation generation module 116 is communicatively coupled to the data acquisition module 114 and configured to determine at least one correlation parameter based on at least one pair of the first sensor signal and the second sensors signal. In one embodiment, the at least one correlation parameter includes a single real value representative of a cross correlation coefficient of the first sensor signal and the second sensor signal. In another embodiment, the at least one correlation parameter includes a plurality of real values representative of a plurality of cross correlation coefficients for the first sensor signal and the second sensor signal computed at a plurality of lags. The term 'lag' used herein refers to relative shift in time measured in number of sample values. The at least one correlation parameter is representative of a similarity between the first sensor signal and the second sensor signal. In another embodiment, the at least one correlation parameter is representative of a shape of the cross correlation signal of the first sensor signal and the second sensor signal. In an alternate embodiment, the at least one correlation parameter includes one or more constants of a parametric equation representative of cross correlation function of the first sensor signal and the second sensor signal. The technique of determining a cross correlation function based on the plurality of sensor signals is explained in a subsequent paragraph with reference to a subsequent figure.

The database module 118 includes a plurality of stored parameters. In one embodiment, the plurality of stored parameters are representative of cross correlation coefficients corresponding to a plurality of cross correlation functions. Each cross correlation function is determined based on a corresponding pair of sensor signals. In one embodiment, the plurality of correlation parameters are stored in a table having rows representative of cross correlation functions and columns representative of cross correlation coefficients for a plurality of lags for a pair of sensor signals. In another embodiment, the plurality of stored parameters are one or more constants of a parametric equation representative of cross correlation function determined based on the pair of sensor signals. The first sensor signal and the second sensor signal used to generate the cross correlation signal may also be stored in the database and an association is established between the pair of sensor signals and the corresponding cross correlation signal. The database module 118 also includes a plurality of known flow conditions corresponding to the plurality of cross correlation functions. The content of the database module 118 is retrieved in real-time. In one embodiment, the database module 118 may be stored in a single memory module such as the memory 124. In other embodiments, the database module 118 may be stored in a plurality of memory modules in a distributed manner including deployment in a cloud or a networked server. The database module 118 may be at least one of a SQL database, an Oracle database, and a MySQL database. In alternate embodiments, other type of databases including relationship database systems (RDBS) may be used to store the sensor signals, cross correlation signals and the corresponding known flow conditions. It may be noted herein that in one embodiment, the database module 118 may be a customized database designed for storing optimized tables representative of known flow conditions and corresponding cross correlation functions. In other embodiments, the database module 118 may be an off-the-shelf database.

The flow condition generation module 120 is communicatively coupled to the database module 118, and the correlation generation module 116 and configured to determine a flow condition. The technique of determining the flow condition 128 includes configuring the flow condition generator module 120 to compare the at least one correlation parameter with a plurality of stored parameters and selecting at least one matching stored parameter. The flow condition generation module 120 is further configured to determine a matching flow condition based on the at least one matching stored parameter. In some exemplary embodiments, an effective inflow angle of attack is determined by the flow condition generation module 120 based on the at least one matching stored parameter. The embodiments disclosed herein determine the flow condition and the effective inflow angle of attack either in real time or through offline processing.

The processor 122 is communicatively coupled to the communications bus 126 and includes at least one arithmetic logic unit, a microprocessor, a general purpose controller or a processor array to perform the desired computations or run the computer program. In one embodiment, the functionality of the processor 122 may be limited to tasks performed by the data acquisition module 114. In another embodiment, the functionality of the processor 122 may be limited to the functions performed by the correlation generation module 116. In another embodiment, the functionality of the processor 122 is limited to the functionality performed by the database module 118. In one exemplary embodiment, the functionality of the processor 122 is limited to the tasks performed by the flow generation module 120. While the processor 122 is shown as a single unit, the system 112 may include at least one processor module embedded in at least one of the modules 114, 116, 118, 120.

The memory 124 is communicatively coupled to the processor 122 and is configured to be accessed by the at least one processor module residing in at least one of the modules 114, 116, 118, 120. In an exemplary embodiment, the memory 124 may refer to one or more of memory modules. The memory 124 may be a non-transitory storage medium. For example, the memory may be a dynamic random access memory (DRAM) device, a static random access memory (SRAM) device, flash memory or other memory devices. In one embodiment, the memory may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one specific embodiment, a non-transitory computer readable medium may be encoded with a program to instruct the at least one processor to perform functions of the data acquisition module 114, the correlation generation module 116, the database module 118, and the flow condition generation module 120.

In one embodiment, the at least one of the data acquisition module 114, the database module 118, the correlation generation module 116, and the flow condition generation module 120 is stored in the memory 124 and executable by the at least one processor 122. In some embodiments, one or more of the modules 114, 116, 118, 120 are implemented as standalone hardware modules. Embodiments include co-located modules or geographically distributed modules co-operatively working to generate the flow condition 128.

In one embodiment, the system 112 is further configured to determine a plurality of surface parameters for optimum operation of the aerodynamic systems such as wind turbines. The plurality of surface parameters include, but not limited to, a pitch angle, a tip speed ratio and an angular speed for the surface. In an exemplary embodiment, the plurality of surface parameters are estimated based on the determined flow condition. In one exemplary embodiment, the processor is further configured to provide one or more of surface parameters to an actuator. The processor may also be configured to instruct the actuator to modify the pitch angle or the tip speed ratio of the surface to operate the wind turbine in an optimum manner.

Figure 2:
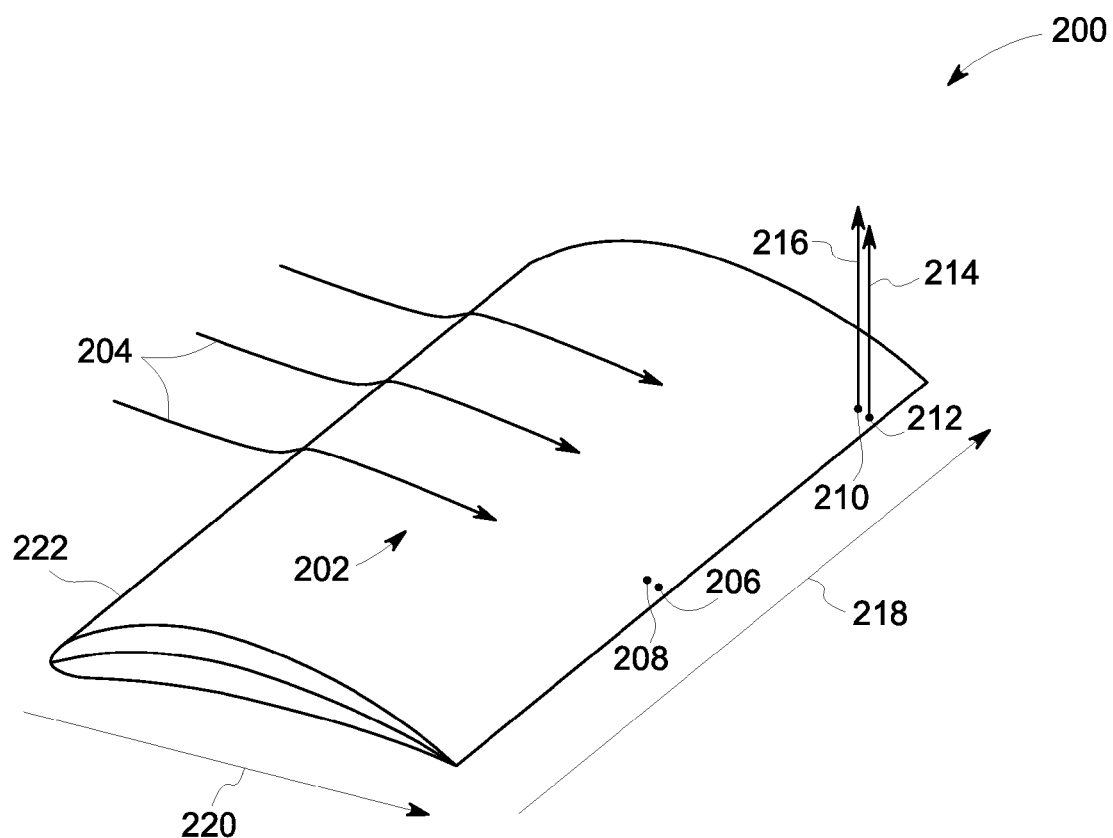
FIG. 2 is a schematic of sensor positions disposed on a surface of a wind turbine blade in accordance with an exemplary embodiment.

FIG. 2 is a schematic 200 of sensor positions disposed on a surface 202 of a wind turbine blade in accordance with an exemplary embodiment. The surface 202 in the illustrated embodiment is a wind turbine blade surface. A plurality of sensors 206, 208, 210, 212 are disposed on the surface 202. It should be noted that even though only four sensors are shown in the drawing, number of sensors positioned on the surface may vary in other embodiments. The surface 202 is experiencing a flow and the direction of flow is illustrated by a plurality of arrows 204. The figure shows a spanwise axis 218 and a chordwise axis 220. A spanwise distance and a chordwise distance of the sensors are measured from a point 222 on the surface. For example, the length of the lines representing the spanwise axis 218 from the point 222 and the length of the lines representing the chordwise axis 220 from the point 222 represent a spanwise length and a chordwise length of the sensor respectively. The plurality of sensors 206, 208 are positioned at a first spanwise position and the plurality of sensors 210, 212 are disposed at a second spanwise position. Similarly, the sensors 206 and 212 are disposed at a first chordwise position and the sensors 208, 210 are disposed at a second chordwise position. In the illustration, the first spanwise position is at 50% of the spanwise length and the second spanwise position is at 90% of the spanwise length. The first chordwise position is at 98% of the chordwise length and the second chordwise position is at 95% of the chordwise length. It may be observed that the first spanwise position is in the middle of the blade surface, the second spanwise position is near the tip of the blade surface. Similarly, both the first chordwise position and the second chordwise position are towards the end of the chordwise length. It should be noted herein that any other spanwise position and the chordwise positions may be chosen for positioning of the plurality of sensors on the surface 202. It is important to note that in order to improve spanwise correlation calculations, sensors should be placed much closer together in the spanwise direction. A plurality of sensor signals 214, 216 are generated in the plurality of sensors. For example, the plurality of sensor signals 214, 216 includes a first sensor signal 214 generated from the sensor 212 and a second sensor signal 216 generated from the sensor 210.

Figure 3:
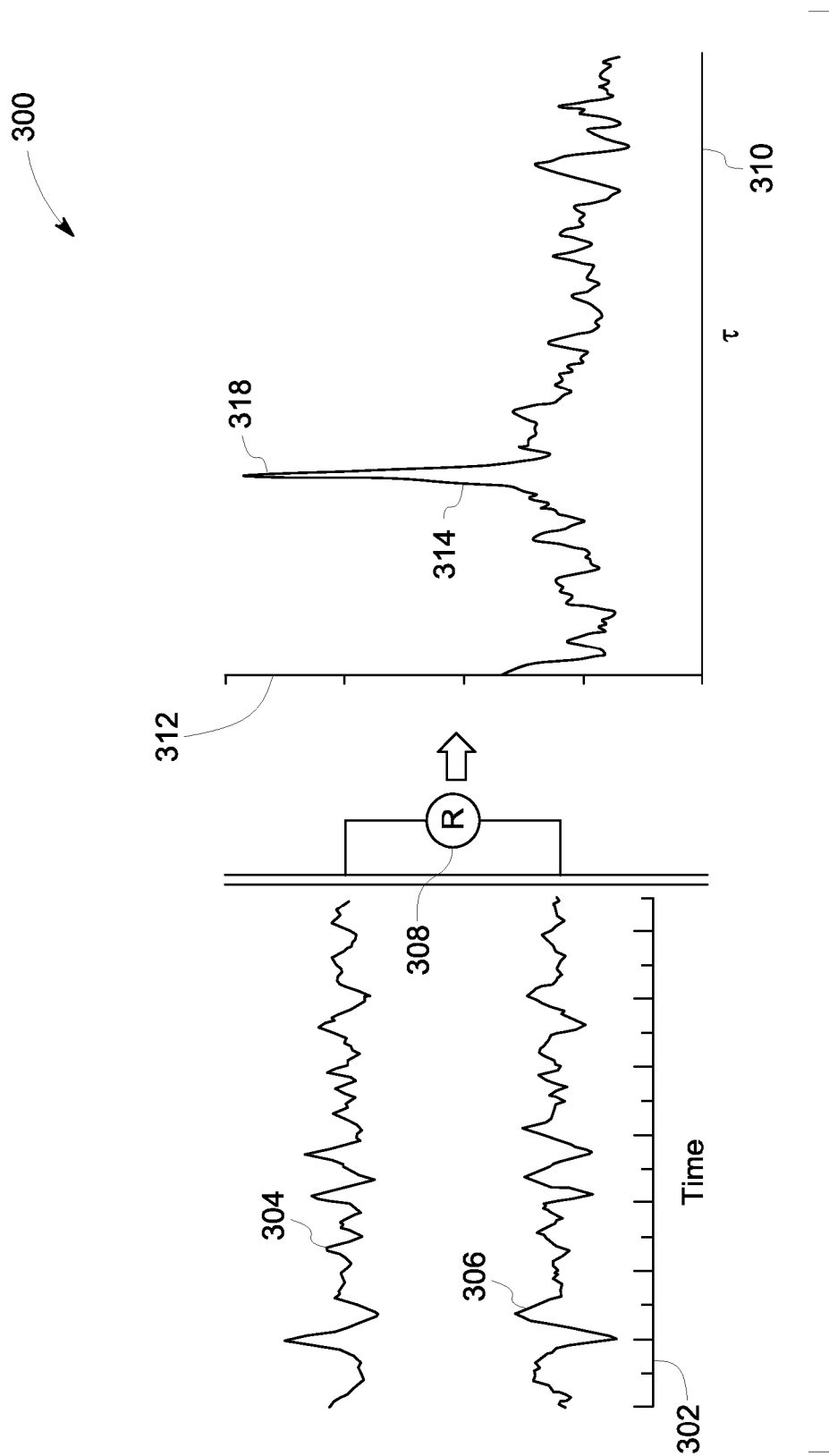
FIG. 3 is a graph illustrating a correlation signal based on a pair of pressure sensor signals in according to an exemplary embodiment.

FIG. 3 is a graph 300 illustrating generation of a cross correlation signal based on a pair of sensor signals 304, 306 in according to an exemplary embodiment. The pair of sensor signals include a first sensor signal 304 and a second sensor signal 306 are plotted as a function of time on a time axis 302. A correlator 308 receives the first sensor signal 304 and the second sensor signal 306 and generates a cross correlation function 314. In an exemplary embodiment, the correlator 308 is part of the correlation generation module 116 of FIG. 1. The correlation function is given by:

$$z(n) = \sum_{k=0}^{N-1} x(k)y(k-n) \qquad (1)$$

where, z(n) is the cross correlation coefficient at lag n, x(n) and y(n) are the first sensor signal 304 and the second sensor signal 306 respectively. The cross correlation coefficient is computed using N samples of the first sensor signal and the second sensor signal. The cross correlation function 314 is plotted as a curve with an x-axis 310 and a y-axis 312. The x-axis is representative of a lag between the first sensor signal 304 and the second sensor signal 306. The y-axis is representative of amplitude of the cross correlation function 314. The points on the curve representing the cross correlation function 314 are representative of a plurality of correlation values. The cross correlation function 314 exhibits a peak value 318 representative of the maximum similarity between the first sensor signal and second sensor signal. In exemplary embodiments, at least one of the amplitude of the peak, and the position of the peak are used to determine the flow condition as explained in subsequent paragraphs with reference to subsequent figures.

Figure 4:
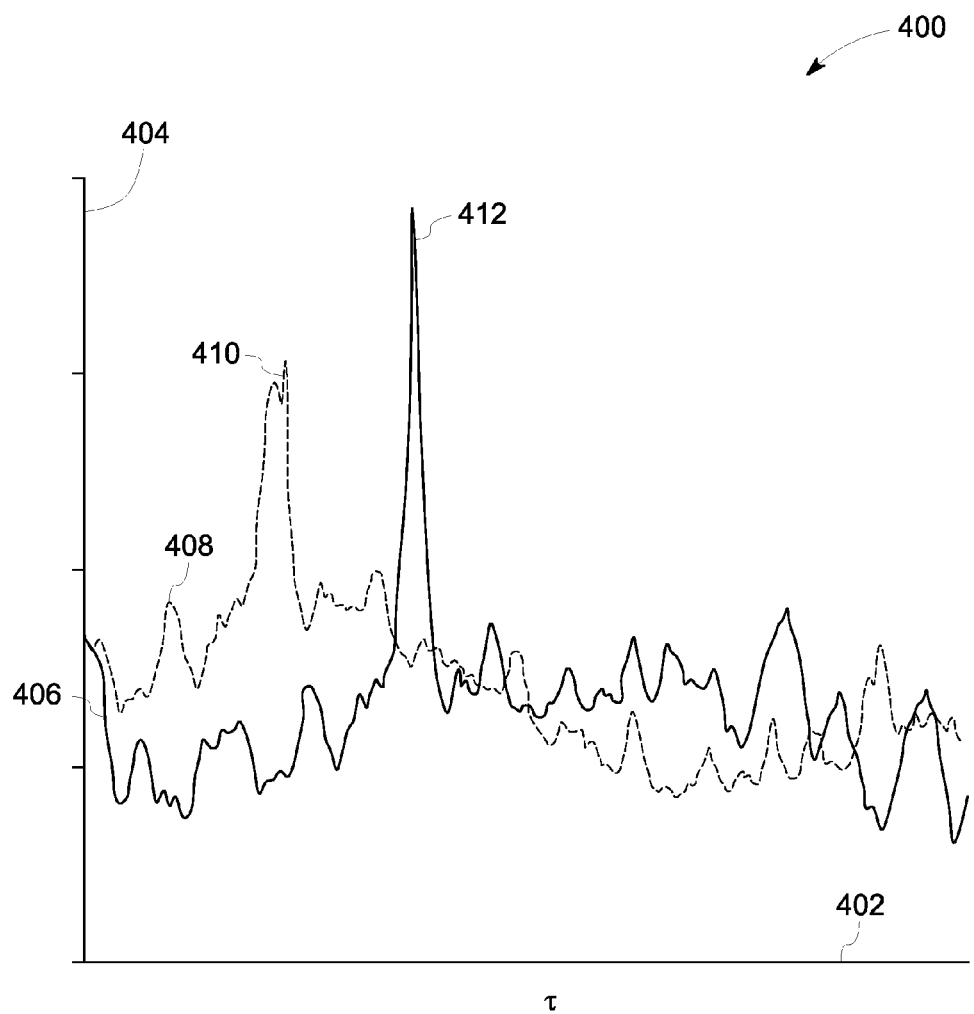
FIG. 4 is a graph of correlation signals corresponding to an attached flow condition and a separated flow condition accordance with an exemplary embodiment.

FIG. 4 illustrates a graph 400 of a plurality of cross correlation signals corresponding to a plurality of flow conditions in accordance with an exemplary embodiment. The graph 400 has an x-axis 402 representative of lag value at which the cross correlation coefficient is computed based on the first sensor signal and the second sensor signal. The graph 400 also has a y-axis 404 representative of amplitude of the cross correlation signals. The graph includes two curves 406 and 408 representative of two cross correlation signals generated based on two different pairs of sensors signals acquired at two different flow conditions. In the illustrated embodiment, the curve 406 having a peak value 412 represents a separated flow condition and the curve 408 having a peak 410 represents an attached flow condition. Similar curves are generated for other flow conditions such as an attached and laminar flow condition, an attached and transitioning flow condition, an attached and turbulent flow condition, a separated flow condition, and a re-attached flow conditions.

In exemplary embodiments, a plurality of stored parameters, representative of sample values of the plurality of cross correlations functions are stored in the database module. A plurality of known flow conditions corresponding to the plurality of cross correlation functions is also stored in the database module. In an exemplary embodiment, at least one correlation parameter is determined from a first sensor signal and a second sensor signal corresponding to an unknown flow condition in real time. The at least one correlation parameter is compared with each of the plurality of stored parameters and a matching stored parameter is determined. A matching flow condition corresponding to the matching parameter is identified. As an example, the at least one correlation parameter may be a measured peak amplitude of the cross correlation function generated based on the measured sensor signals. In one embodiment, the measured peak amplitude is compared with peak amplitudes of the correlation functions represented by the curves 406 and 408. One of the peak amplitudes 410, 412 nearest to the measured peak amplitude is a matching correlation parameter. In another embodiment, a plurality of correlation values corresponding to each of the curves 406, 408 are considered. A plurality of correlation values corresponding to the measured cross correlation function are compared to find a curve that matches the lag of the peak value. At least one matching parameter is determined based on the comparison.

In another exemplary embodiment, a decision rule may be used evaluate the plurality of correlation values for determining the flow condition. In some embodiments, the decision rule is a heuristic rule derived based on observation and analysis of historical data. A plurality of decision rules are used to test applicability of a plurality of flow conditions to the plurality of correlation values. Each decision rule among the plurality of decision rules is related to a corresponding flow condition. When the plurality of correlation values satisfy a decision rule, a corresponding flow condition is determined. As an example, a separated flow is determined based on the plurality of correlation values generated over a time period. A plurality of correlation functions are determined for a first sensor signal and a second sensor signal acquired in a plurality of time windows for a predetermined period of time. A first test is performed on the plurality of correlation functions to determine a shift in the position of the peak of the correlation function. When the shift exceeds 25% in lag time scale of the correlation function within the predetermined period of time, a second test is performed for amplitude change of the peak amplitude. If the peak of the correlation function is growing, and the peak amplitude changes by for example 50% within the predetermined period, then a separated flow condition is determined.

In an exemplary embodiment, at least one correlation parameter is parameterized based on a space-time correlation function between two distinct points in the flow field for the purposes of reducing data storage and transmission requirements. The parametric equation for the correlation function is given by:

$$R = A^2 \left(\frac{2\bar{p}k}{3}\right)^2 \frac{1}{B\tau_s^2} e^{\left[-\frac{1}{Cl_\xi^2}(\xi^2 + \eta^2) - \frac{\zeta^2}{l_\eta} - \frac{\tau^2}{B\tau_s^2}\right]} \quad (2)$$

where, R is correlation function, $\xi$, $\eta$ and $\zeta$ are geometric separation between the two points of interest in x,y,z co-ordinates respectively, and $\tau$ is the temporal variable. The variable A, B and C are model constants, $\rho$ is density, $l_s$, $l_n$ are turbulent length scales, k is turbulent kinetic energy, $\tau_s$ is time scale of the flow field. The variables length scale and the time scale of the flow field are dependent on the specific dissipation rate w and the turbulent kinetic energy k. The values for the model A, B, and C are determined as the at least one correlation parameter based on one or more cross correlation functions provided by Equation (1). The one or more model constants are used for determination of the flow condition.

In an alternative embodiment, the parametric equation for the correlation function R is a sum of two Gaussian distributions and is represented as:

$$R(\xi, \eta; \tau) = N_1(A_1, \sigma_1, \theta_1, u) + N_2(A_2, \sigma_2, \theta_2, u) \quad (3)$$

where, $\xi$, $\eta$ are special variables and $\tau$ is the temporal variable, $A_1$, $A_2$ are constants, $\sigma_1$, $\sigma_2$ standard deviations of the two distributions, $\theta_1$, $\theta_2$ are eddy lifetime variables, u represents the turbulent convection velocity within the boundary layer. The Gaussian distribution $N_k(\ )$ is given by:

$$N_k(A_k, \sigma_k, \theta_k, u) = A_k e^{-\frac{\tau}{\theta_k}} \cdot \exp\left[-\frac{(\xi - u\tau)^2 + \eta^2}{2\sigma_k^2}\right] \quad (4)$$

The parameter values for constants, standard deviations, eddy lifetime variables, and convention velocity are determined based on one or more cross correlation functions. In alternate embodiments, other parametric equations may be used and corresponding parameters are determined based on the at least one correlation variable.

In exemplary embodiments using the parametric equations, one or more parameters of the parametric equation are stored in the database. Corresponding parameter values are determined based on the at least one correlation parameter determined based on the first response signal and the second response signal. In some embodiments, the parameter values are converted back to the at least one correlation parameter while determining at least one matching stored parameter. In another embodiment, the parameters stored in the database are compared with the parameters computed based on the at least one correlation parameter while determining the at least one matching stored parameter.

Figure 5:
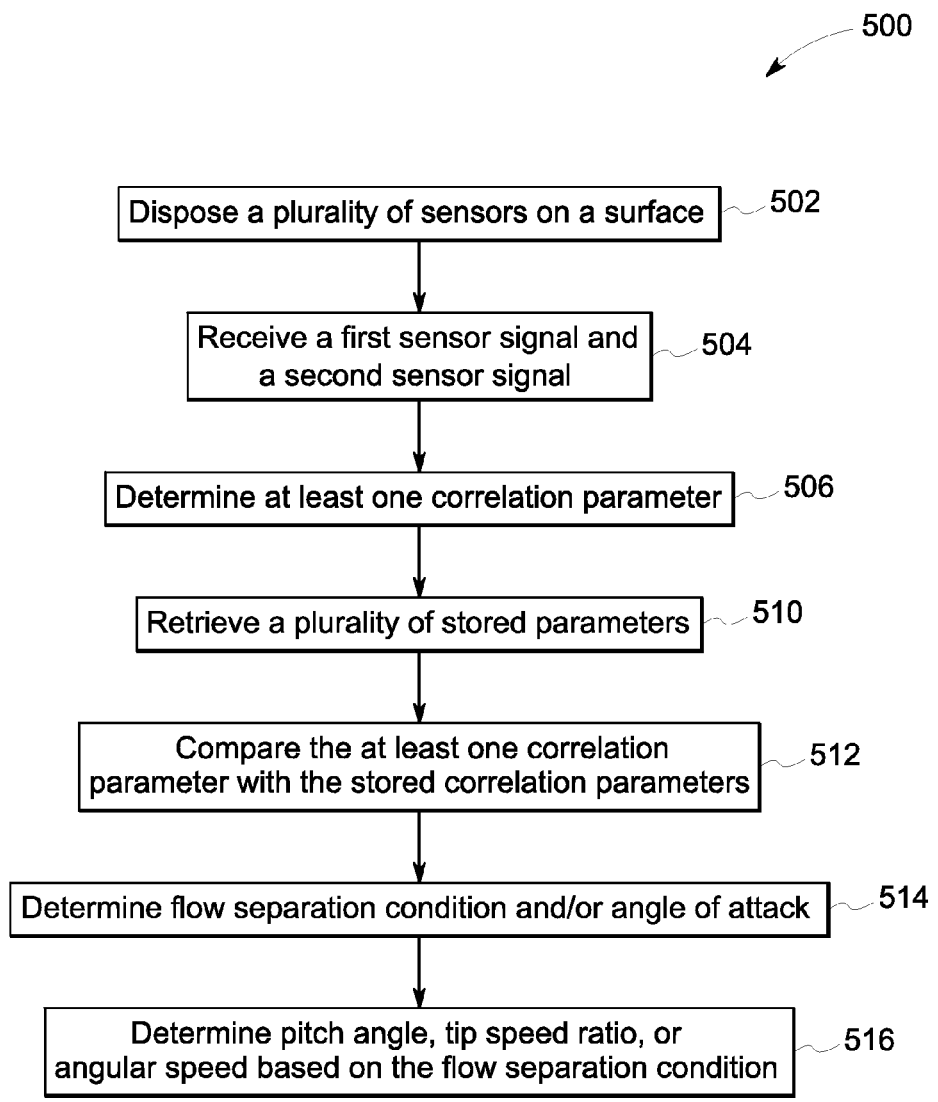
FIG. 5 is a flow chart of a method of determining a flow condition in accordance with an exemplary embodiment.

FIG. 5 is a flow chart 500 representing a method of determining a flow condition in accordance with an exemplary embodiment. The method includes disposing a plurality of sensors on a surface experiencing a fluid flow in the step 502. The plurality of sensors may include a plurality of pressure sensors measuring pressure experienced by the surface due to the fluid flow, or a plurality of velocity sensors measuring velocity of the fluid over the surface. The sensors in the plurality of sensors generate a plurality of sensor signals that includes at least one first sensor signal and at least one second sensor signal.

The method further includes receiving the first sensor signal and the second sensor signal for determining a flow condition over the surface as illustrated in step 504. The receiving of the first sensor signal includes measuring a signal from a first sensor disposed at a first spanwise position and a first chordwise position. The receiving of the second sensor signal includes measuring another signal from a second sensor disposed at a second spanwise position and a second chordwise position. In one embodiment, at least one correlation parameter is determined based on the first sensor signal and the second sensor signals as in step 506. In alternative embodiments, a cross correlation function is determined based on the first sensor signal and the second sensor signal. In one embodiment, one or more of parameters are determined based on the at least one correlation parameter based on a parametric equation representative of the correlation function. A plurality of stored parameters is retrieved from a database in step 510. In one embodiment, the stored parameters are a plurality of correlation values corresponding to a plurality of flow conditions. In another embodiment, the stored parameters are one or more or the parameters of the parametric equation corresponding to a plurality of flow conditions.

The at least one correlation parameter is compared with the plurality of stored parameters to determine at least one matching stored parameter in step 512. In an alternate embodiment, at least one parameter value is compared with a plurality of stored parameter values to determine at least one matching stored parameter value. A known flow condition corresponding to the at least one matching stored parameter value is determined in step 514 as the matching flow condition. In alternate embodiments, an angle of attack is determined in the step 514 based on the at least one matching stored parameter.

In some embodiments, one or more operating parameters of the surface may be changed (based on the determined flow condition and/or angle of attack) to enhance the performance of the aerodynamical system as illustrated in step 516. If the flow condition is to be changed for optimized operation, a target operating parameter value requiring a minimum correction from the present value of the operating condition corresponding to the determined flow condition is determined. In one embodiment, the operating parameter is a pitch angle. In alternative embodiments, the operating parameters include a tip speed ratio and an angular speed of the surface. The operating parameter of the surface is modified towards the target operating parameter by a suitable control mechanism. More specifically, a predominantly attached flow condition is desired for the optimum operation of the blade surface of the wind turbine. The flow condition of the blade is determined and whenever the flow condition departs from the attached flow condition, the pitch angle of the blade is modified in such a way that the flow condition around the blade is changed to the attached flow condition.

Embodiments of the techniques disclosed herein, provides a mechanism to monitor a flow condition of a surface and identifies separated flow conditions and determines corrections for operating parameters of the aerodynamical systems involving the surface. The technique enables adaptive control strategies to mitigate flow separation and improve blade efficiency, and annual energy production (AEP) simultaneously reducing the noise generated during operation of the aerodynamical system such as a wind turbine. Parametric representation of the plurality of correlation parameters helps reduction of memory storage requirements as well as ease of comparison calculations.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method, comprising:
   disposing a plurality of sensors on a surface of an aerodynamic system;
   receiving a first sensor signal and a second sensor signal from the plurality of sensors;
   determining at least one correlation parameter based on the first sensor signal and the second sensor signal;
   receiving a plurality of stored parameters from a database, wherein each of the plurality of stored parameters is representative of a corresponding flow condition;
   comparing the at least one correlation parameter with the plurality of stored parameters and selecting at least one matching stored parameter; and
   determining a matching flow condition based on the at least one matching stored parameter, wherein the matching flow condition comprises one of an attached and laminar flow condition, an attached and transitioning flow condition, an attached and turbulent flow condition, a separated flow condition, or a re-attached flow condition.

2. The method of claim 1, wherein the plurality of sensors comprises one of a plurality of pressure sensors and a plurality of velocity sensors.

3. The method of claim 1, wherein the aerodynamic system is a wind turbine and the surface is a blade surface of the wind turbine.

4. The method of claim 3, wherein disposing the plurality of sensors comprises disposing the plurality of sensors at a plurality of spanwise positions on the blade surface, wherein the plurality of spanwise positions include a first spanwise position and a second spanwise position.

5. The method of claim 4, wherein disposing the plurality of sensors comprises disposing the plurality of sensors at a plurality of chordwise positions on the blade surface, wherein the plurality of chordwise positions include a first chordwise position and a second chordwise position.

6. The method of claim 5, wherein receiving the first sensor signal and the second sensor signal comprises measuring a signal from a first sensor disposed at the first spanwise position and the first chordwise position, and another signal from a second sensor disposed at the second spanwise position and the second chordwise position respectively.

7. The method of claim 1, wherein the at least one correlation parameter is a cross correlation coefficient between the first sensor signal and the second sensor signal.

8. The method of claim 1, wherein the plurality of stored parameters corresponds to a plurality of cross correlation coefficients of a pair of sensor signals acquired at a plurality of known flow conditions.

9. A system, comprising:
at least one processor module and a memory module communicatively coupled to each other through a communications bus;
a database module storing a plurality of stored parameters, wherein each of the plurality of stored parameters is representative of a corresponding flow condition;
a data acquisition module configured to receive a first sensor signal and a second sensor signal from a plurality of sensors disposed on a surface of an aerodynamic system;
a correlation generation module communicatively coupled to the data acquisition module and configured to determine at least one correlation parameter based on the first sensor signal and the second sensor signal; and
a flow condition generator communicatively coupled to the database module and the correlation generator module and configured to:
compare the at least one correlation parameter with the plurality of stored parameters and selecting at least one matching stored parameter; and
determine a matching flow condition based on the at least one matching stored parameter, wherein the matching flow condition comprises one of an attached and laminar flow condition, an attached and transitioning flow condition, an attached and turbulent flow condition, a separated flow condition, or a re-attached flow condition;
wherein, at least one of the database module, the data acquisition module, the correlation generation module, and the flow condition generation module is stored in the memory and executable by the processor.

10. The method of claim 9, wherein the plurality of sensors comprises one of a plurality of pressure sensors and a plurality of velocity sensors.

11. The system of claim 10, wherein the correlation generation module is configured to determine at least one cross correlation parameter between the first sensor signal and the second sensor signal.

12. The system of claim 10, wherein the database stores a plurality of cross correlation parameters of a pair of sensor signals acquired at a plurality of known flow conditions.

13. The system of claim 9, wherein the aerodynamic system is a wind turbine and the surface is a blade surface of the wind turbine.

14. The system of claim 13, wherein the plurality of sensors are disposed at a plurality of spanwise positions, wherein the plurality of spanwise positions include a first spanwise position and a second spanwise position.

15. The system of claim 14, wherein the plurality of pressure sensors are disposed at a plurality of chordwise positions, wherein the plurality of chordwise positions include a first chordwise position and a second chordwise position.

16. The system of claim 15, wherein the data acquisition module is further configured to receive a signal from a first sensor disposed at the first spanwise position and the first chordwise position, and another signal from a second sensor disposed at the second spanwise position and the second chordwise position respectively; or any other combination of spanwise and chordwise sensor locations.

17. The method of claim 1, further comprising modifying one or more operating parameters of the surface based on the determined matching flow condition.

18. The method of claim 17, wherein modifying the one or more operating parameters of the surface comprises changing at least one of a pitch angle, a tip speed ratio, an angle of attack, and an angular speed of the surface based on the determined matching flow condition.

19. The system of claim 9, wherein the flow condition generator is further configured to instruct an actuator to modify one or more operating parameters of the surface based on the determined matching flow condition.

20. The system of claim 19, wherein the flow condition generator is further configured to modify one or more of a pitch angle, a tip speed ratio, an angle of attack and an angular speed of the surface based on the determined matching flow condition.

* * * * *